United States Patent [19]
Macovski

[11] 3,749,493

[45] July 31, 1973

[54] METHOD AND APPARATUS FOR PRODUCING A CONTOUR MAP OF A SURFACE AREA

[75] Inventor: Albert Macovski, Palo Alto, Calif.

[73] Assignee: Stanford Research Institute, Menlo Park, Calif.

[22] Filed: Jan. 5, 1972

[21] Appl. No.: 215,520

[52] U.S. Cl. .................. 356/2, 356/109, 356/3.5
[51] Int. Cl. ............................................ G01c 11/12
[58] Field of Search ................ 356/2, 109, 3.5; 350/130

[56] References Cited
UNITED STATES PATENTS

| | | | |
|---|---|---|---|
| 2,759,814 | 8/1956 | Kegeles | 356/2 X |
| 3,675,075 | 7/1972 | Kohashi | 250/213 R |
| 3,633,987 | 1/1972 | Brooks | 356/109 |

*Primary Examiner*—Ronald L. Wibert
*Assistant Examiner*—Paul K. Godwin
*Attorney*—Urban H. Faubion et al.

[57] ABSTRACT

Altitude contour lines are generated on the image of a surface so that a photographic contour map can be made. The contour lines are generated as light interference fringes (a light interference pattern) by modulating both the light illuminating the surface being mapped and the light reflected from the surface. Modulation of either the illuminating or the reflected light must be periodic and the altitude difference between contour lines is determined by the frequency or periodicity of modulation.

33 Claims, 10 Drawing Figures

FIG_1

FIG_2

FIG_3

FIG_6

FIG_7

FIG_8

METHOD AND APPARATUS FOR PRODUCING A CONTOUR MAP OF A SURFACE AREA

BACKGROUND OF THE INVENTION AND FIELD OF INVENTION

1. Field of the Invention

This invention relates generally to topography. That is, it relates to the production of an image of the physical features of a place or region in a way to delineate relative positions and elevations of such features. In a primary application, the invention relates to the production of photographic contour maps.

2. Description of Prior Art

The most pertinent information relative to the present invention is found in one of its larger fields of application, i.e., contour mapping. Contour mapping systems generally use a pair of aerial photographs taken from different points to form a stereo pair. The photographs are used in elaborate manually operated instruments which first correct for attitude or altitude differences that existed when the two photographs were taken. Then, using a complex stereoscopic plotting instrument which produces a three-dimensional optical model of the terrain, a compiler draws contour lines at selected altitude levels. The stereoscopic plotting instruments cost thousands of dollars and the compiler must wear special eyeglasses with different colored filters over each eye. The task is tedious and hard on the eyes of the compiler.

Contouring of small objects is presently done using coherent interferometry. The reflected light from an object is added to a coherent reference beam to form interference fringes indicative of the phase of the optical wave front. The phase of the wave front is proportional to the length of the path to the object and thus indicates the height or altitude contours. For example, see "Holographic Height Contouring and Related Techniques," by Tadao Tsuruta, *Applications de l'Holographie*, July 1970.

Such systems are limited to relatively small objects because of the limited coherence length of available coherent light sources (lasers). Thus, coherent interferometry is unsuitable for the large-scale contours required for large areas having large altitude differences as in topographic maps.

OBJECTS OF THE INVENTION

An object of this invention is to provide an image of a surface with elevational contour lines formed as part of the image.

It is also an object of the invention to record photographically an altitude contour map, thus eliminating the need for complex stereo plotting instruments and the time consuming and expensive plotting procedures usually required by photogrammetric contour plotting methods.

It is a further object of this invention to provide a means and method producing an image of a surface with elevational contour lines directly on the image and means for automatically correcting the location of the contour lines for the error which would normally occur due to differences in length of the radius vector from the image to surface points over the full lateral area of the surface observed.

SUMMARY OF THE INVENTION

Briefly, in accordance with the invention altitude contour lines are generated directly on the image of a surface as light interference fringes by modulating the light illuminating the surface and the light reflected from that surface. The image may be processed by taking a photograph to form a photographic contour map. Either or both the incident and the reflected light are modulated cyclically to produce contour lines with an altitude difference of a half wave length of the cyclical modulation frequency.

BRIEF DESCRIPTION OF THE DRAWINGS

The novel features which are believed characteristic of the invention are set forth with particularity in the appended claims. The invention itself, however, both as to its organization and method of operation, together with further objects and advantages thereof may best be understood by reference to the following description taken in connection with the accompanying drawings in which:

DESCRIPTION OF THE PREFERRED EMBODIMENT

Figure 1:
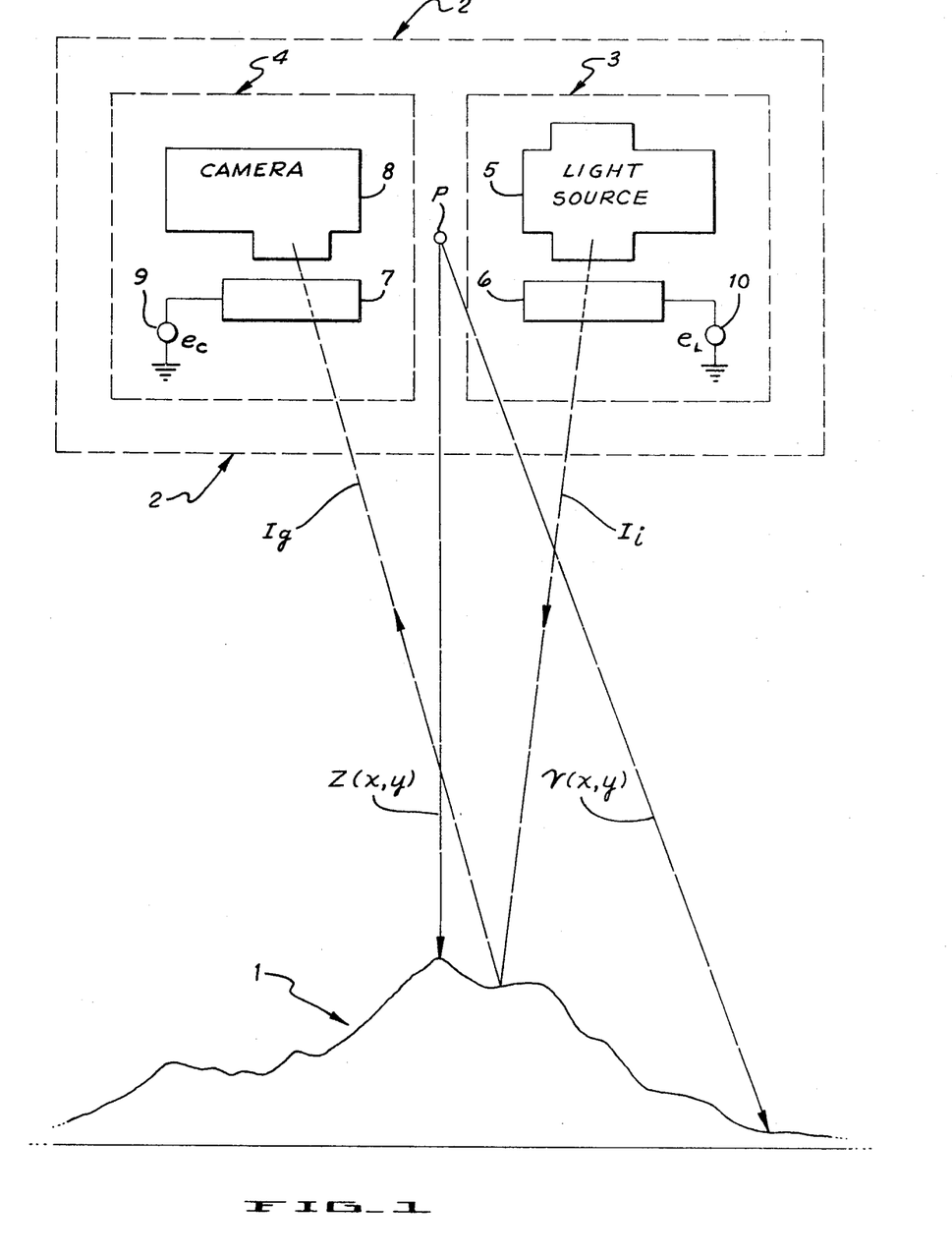
FIG. 1 is a profile view partially in block diagram form schematically illustrating an embodiment of the invention which uses the principle of modulating both the incident and the reflected light.

An understanding of the broad aspects of the invention may best be had by reference to FIG. 1 of the drawings which is a profile view with the vertical scale greatly expanded relative to the horizontal scale.

In the drawing an irregular surface 1 whose topography is to be mapped or represented in two-dimensional form is shown. The surface illustrated here is an area on the surface of the earth, since a primary application of the invention is for the production of orthophotographic contour maps. In order to produce an image of the physical features of the surface 1 in a way to delineate both relative position and elevation, a processing unit 2 is provided directly above the surface 1. The vertical height Z of the processing unit 2 from the earth's surface 1 is such that the entire processing unit 2 can be assumed to be at a single point P.

Proper illumination of the surface 1 being mapped is provided by an illuminating source 3 which is part of the processing unit 2 and an image of the surface 1 observed is produced with contour lines directly on the image to delineate relative elevations of features on the surface by an image receiving and processing unit 4 which receives reflected light from the surface being mapped and utilizes the reflected light.

Light from the illuminating source 3 is generated by a light source 5 and radiates radially (e.g., along radii $r$ and $Z$ in the illustration) outward toward the surface 1 of the ground. In order to generate the topological information desired on the image of the surface 1 the incident light from source 5 must be modulated. This modulation is provided by a light modulator 6 (incident light modulator) between light source 5 and the surface 1 being illuminated and which, as illustrated, forms a part of illuminating source 3.

In view of the difference in radial distance between the point of origin P of the light and different points on the earth's surface 1 (e.g., see the difference between the radial distance $r$ of the vertical distance Z), different positions of the illuminating light modulation cycle reach different portions of the ground surface 1 at different times. Thus, the light reflected from the ground surface 1 is modulated by incident light modulator 6 and also by virtue of different portions of the light modulation cycle reaching different portions of the ground surface at different times depending on their distance from the source. The difference in distance from the light source 5 to points on the ground includes elevational differences due to surface irregularities.

The light reflected from the ground surface 1, which contains all the information with respect to relative positions and elevations of surface features, is received at the processing unit 2 and an image which presents such information is produced in the image receiving and processing unit 4. In order to produce an image containing the information relative to both position and elevation of surface features in the form desired, the image receiving and processing unit 4 is provided with an additional light modulator 7 (reflected light or camera modulator) which provides modulation of the light received from the ground so that light from different portions of the ground surface 1 will be passed or blocked in varying degrees depending upon the distance in wave lengths of the reflecting feature from the reflected light modulator 7 and the condition of the light modulator at the instant of light incidence. In the embodiment illustrated, a camera 8 is provided so that the image containing the surface information can be reproduced on photographic film.

As pointed out above, the light incident upon the surface of the ground 1 is modulated by incident light modulator 6 between the light source 5 and the ground 1, and the light reflected is also modulated by a reflected light modulator 7 which is inserted between the ground 1 and the camera 8. A light modulator which may be used in both applications is one of the class of electro-optic devices which consists of electro-optic material having its bi-refringence proportional to the voltage applied to the cell. A more complete description may be found in such articles as "Sound on Film Recording Using Electro-Optic Crystal Techniques," by Robert Dressler and Albert A. Chesnes in the March 1953 Journal of the SMPTE, Vol. 60, pp. 205-216. The proper modulation functions for incident light modulator 6 and reflected light or camera modulator 7, respectively, are provided by voltage generators 9 and 10 which generate driving voltages $e_c$ and $e_L$, respectively, that are applied to the respective modulators.

Assume the light modulating voltage $e_L$ (from voltage generator 9) to be of the general form $f_L(t)$, it therefore causes light source modulator 6 to modulate light from light source 5 in that form; i.e., $f_L(t)$. Then the intensity $I_i$ of light reaching points defined by coordinates $(x,y)$ on the surface 16 may be described mathematically as $$I_i = f_L (t-r(x,y)/c,)$$

where $r$ is the distance to each point and $c$ is the velocity of light.

The intensity $I_g$ of light reflected from the surface of the ground 1 due to the modulated light source 5 is then the product of the intensity $I_i$ of incident light and the reflectance, $a(x,y)$, of the various ground points; mathematically expressed, $$I_g = a(x,y) f_L(t-r(x,y)/c)$$

The reflected light wave passes through the reflected light or camera modulator 7 where it is modulated by a function $f_c(t)$, as determined by the form of the modulating voltage $e_c$ applied to the camera modulator 7. In the embodiment illustrated, the reflected light is imaged by the lens of camera 8 onto a film plane.

The intensity $I_c$ of the image at the film plane is then the intensity at the ground $I_g$, as modified by the modulation function $f_c(t)$ introduced by camera modultor 7 and the demagnification and absorption caused by the lens of camera 8. Where the demagnified image in the film plane of camera 8 is expressed as $a'(x',y')$, as is conventional, the image intensity is given by $$I_c = a'(x',y') f_L(t-2r/c) f_c(t)$$

In order properly to reproduce the image of the ground surface 1 on film with the elevation contours superimposed, the exposure should be long enought to encompass a number of cycles (e.e., > 10) of the time varying intensity pattern. Thus, the exposure performs a "long term" integration and the intensity of the pattern $_c$ is given by $$I_c = \int I_c dt = a'(x',y') \int f_c(t) f_L(t - 2r/c) dt = a'(x',y') [f_c(2r/c) \star f_L(2r/c)]$$

where ★ indicates the cross-correlation operation. Thus the resultant image is spatially modulated by the cross-correlation of the two light modulating functions. For example, let the light source be a very narrow pulse so as to be approximated by a delta function $\delta(t)$. If the camera modulation function is sinusoidal with a signal $f_c(t) = 1 + \cos\omega t$ the resultant integrated intensity pattern is given by $$\bar{I}_c = a'(x',y')[1 + \cos(2\omega r/c)] = a'(x',y')[1 + \cos2kr]$$

where $k$ is the wave number at the frequency $\omega$. Thus the demagnified image $a'$ will have sinusoidal contour fringes indicating the distance $r$ with a new fringe occurring every half wavelength of the angular frequency $\omega$.

In order to approximate a delta function, the width of the light pulse at the source must be small as compared to the period of the sinusoidal modulating signal at the camera modulator 7. For example, the light pulse at the source 5 should be on the order of one-tenth or less of the period of the sinusoidal modulating signal at the camera modulator 7. For relatively low frequencies, corresponding to coarse contours, this is quite straightforward. Where relatively fine contours are required, necessitating microwave frequency modulating signals, a very narrow pulse may be different to generate, in which case both light source and camera can be sinusoidally modulated at the same frequency with the same signal, resulting in an integrated intensity pattern given by $$\bar{I}_c = a'(x',y')[1 + \tfrac{1}{2}\cos2kr]$$

This is the same pattern given in the pulsed case except that the modulation percentage of the resultant contour fringes has been halved, i.e., the amplitude of contrast of the actual contour lines is halved.

It is clear from the symmetry of the system that the roles of the modulating functions can be reversed with the same end result. Thus, the light source 5 could be modulated sinusoidally with the camera modulator 7 pulsed to achieve the same result as given previously. Many other combinations of modulating functions can be used depending on the pattern desired and the limitations imposed by frequency response. At least one of the two functions must be cyclical with its period determining the fringe density or contour spacing. If narrow lines are desired, one of the modulators (light modulator 6 and camera modulator 7) can be pulsed with the other driven by a series of repetitive narrow pulses such that the cross-correlation is an array of pulses. This same pattern can also be realized by using a repetitive pulse at the same frequency in both the light and camera modulators. If square wave contour shapes are desired, the light source 5 can be pulsed with the camera modulator 7 driven on and off with a square wave. In all cases the final contour shapes are determined by the cross-correlation.

Figure 2:
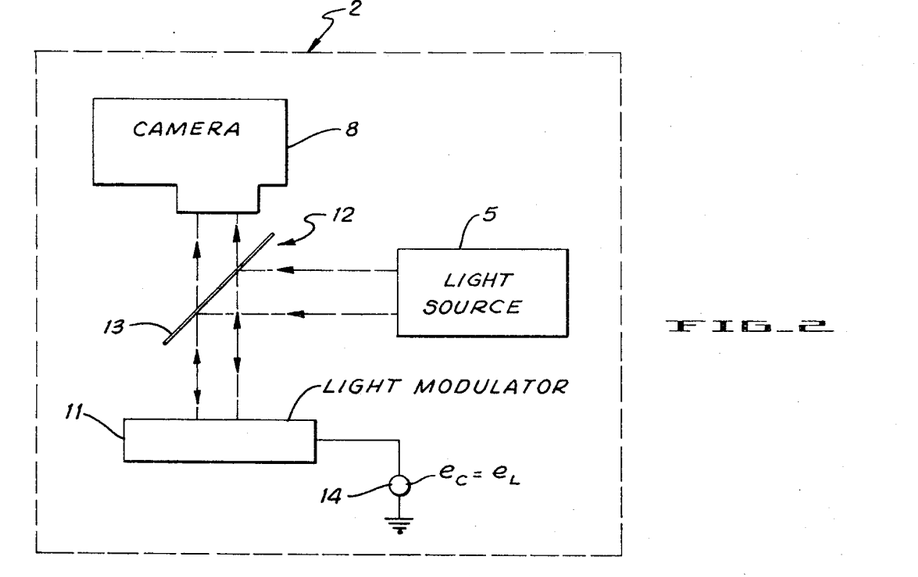
FIG. 2 is a block diagram showing details of a processing unit capable of use in place of the one illustrated in FIG. 1 wherein a partially silvered mirror splits the light into two paths, thus requiring only a single light modulator.

A simplified processing unit which can be substituted directly for the processing unit 2 of FIG. 1 is illustrated in FIG. 2. The prodessing unit 2 of FIG. 2 is simplified in that it utilizes a single light modulator 11 (called incident and reflected light modulator) to modulate both the light from the light source 5 to the surface being mapped and the light reflected from the surface. To simplify both the drawings and the description, corresponding elements of FIGS. 1 and 2 are given the same reference numerals. A light splitter 12 consisting of a partially silvered mirror 13 which is positioned to combine both the light from the light source 5 and the light reflected from the surface being mapped, here the light to the camera 8, allows the use of the single light-modulator 11. The light coming from light source 5 is reflected off the half silvered mirror 13 of the light splitter 12 through the single incident and reflected light modulator 11 toward the surface to be contoured and the reflected light goes back through the same light modulator 11, through partially silvered mirror 13 into camera 8. A single voltage source 14 provides both the camera and light modulating voltages $e_c$ and $e_L$. The resulting intensity pattern then is the same as described above for the case where the desired modulating signals are the same or equal, such as both sinusoidal.

Light sensitivity is a problem with any photographic system using artificial light at considerable distances. One solution to this problem, over and above using intense sources and fast photographic films, is to increase the intensity of the image with an image intensifier.

Figure 3:
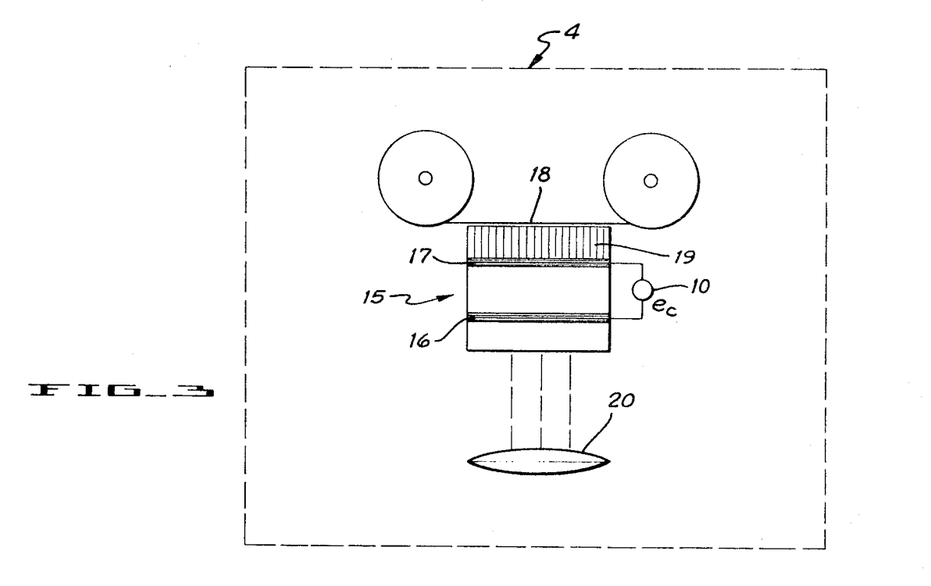
FIG. 3 is a side elevation showing an alternate image reconstructing and processing unit capable of use in the system of FIG. 1 which uses an electronic image intensifier that both intensifies and modulates the reflected light.

FIG. 3 shows the application of such an image intensifier 15 as a part of the image receiving and processing unit 4 which can be substituted for the image receiving and processing unit 4 of FIG. 1. Any type of image intensifier may be used but one satisfactory type is illustrated and described by R. P. Randall in an article, entitled, "Operating Characteristics of a Four-Stage Intensifier" which appears on pages 87 through 99, inclusive, in *Advances in Electronics and Electron Physics*, Vol. 22a, edited by L. Marton, Academic Press, New York, 1966. The image intensifier 15 illustrated provides amplification by imaging the surface being mapped onto a photo-emissive surface 16 and accelerating the resultant electrons which hit a phosphor layer 17. The resultant luminescent image can be applied to a photosensitive film 18 directly through a fiber optics face 19 as shown. This device also provides a convenient vehicle for modulating the reflected light, in that the voltage from a voltage generator 10 is applied directly to the image intensifier control electrodes to modulate the control voltage of the image intensifier 15. The surface being mapped is imaged on the image intensifier 15 by an objective lens 20.

In contour maps, it is often desirable to create a combination of both coarse and fine contour lines to assist in the interpretation of the data. For example, contour maps often contain line structures at both 10 and 100 foot intervals. Lines of different density or different widths are used to delineate the coarse (100 ft) from the fine (10 ft) contour lines. With the system described here coarse contour lines are readily provided by changing the periodic modulation signal at every $n$th pulse where $n$ is the ratio of the coarse contour intervals to the fine contour intervals. The signal can be changed in either amplitude or width or some combination of the two to provide the desired visual result. In those cases where very high frequency signals are used, it is only convenient to use resonant sine waves. In those cases a subharmonic sinusoidal signal would be added to the sinusoidal modulation signal so as to make every $n$th pulse distinct.

The contour fringes generated by the methods shown thus far represent the length of the radius vector $r$ from the origin (point P, or the location of processing unit 2 in FIG. 1) to a point $(x,y)$ on the surface 16. This radius vector is defined as the slant range. It is more often desired to produce contour lines (interference fringes) representative of the altitude $Z(x,y)$ rather than slant range. (See FIG. 1). The relationship between slant range, ($r$) and altitude, Z, is:

$$Z = \sqrt{r^2 - (x^2 + y^2)}, \text{ and}$$

for $r^2 >> (x^2 + y^2)$ $$Z \cong r - (x^2 + y^2/2r)$$

Thus in regions where $x^2 + y^2$ are relatively small the slant range contours represent a good approximation of the altitude contours. We can derive an expression for the maximum radius R on the surface 1 wherein a specified maximum contour error is not exceeded. If we allow a maximum contour error of one fringe, or half of a wavelength at the modulation frequency, we obtain $$R^2/2r = \lambda/2$$

where $R^2 = \max(x^2 + y^2)$. This can be simplified as $$R = \sqrt{r\lambda}$$

Thus, the maximum radius $R$ in which the resultant fringes are a good approximation to the altitude is given by the geometric mean of the slant range $r$ and the modulation wavelength $\lambda$. For example, if the source and camera are 5,000 feet high, using 100 ft. contours the maximum radius R over which the approximation holds is 1,000 feet.

Figure 4:
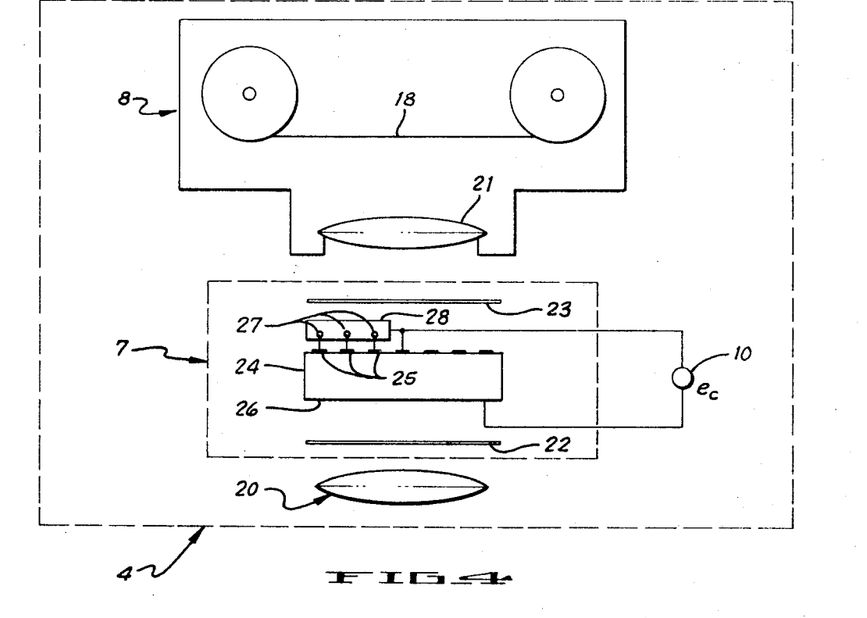
FIG. 4 is a side elevation showing another embodiment of an image reconstructing and processing unit which corrects the contours for lateral displacement from the center of the area being observed or mapped and thus provides accurate altitude contours.

Alternatively a correction method can be used since $r,x$, and $y$ are known at each point and can be used to accurately calculate Z. Fig. 4 illustrates one method of correcting the resultant image (and photograph) so that the contour fringes will represent the altitude Z rather than the slant range $r$. The correction takes place in the image receiving and processing unit 4 so only this portion of the system is illustrated. For sake of clarity and simplicity, those elements which are common to embodiments previously described are given corresponding reference numerals. For example, again objective lens 20 images the surface being mapped (not shown) into the center of an electro-optic light modulator 7 and the modulated image and camera 8 are used to record the image. The camera 8 is entirely conventional and incorporates a relay lens 21 which focuses the modulated image onto the photosensitive photographic film 18.

The reflected light modulator 7 is the element, in the embodiment illustrated, which performs the slant range contour to altitude contour correction. The modulator 7 is similar to conventional ones (e.g., the laminated structures described in the Dressler and Chesnes article, supra.) in that it includes the usual arrangement of a linear polarizer 22 and analyzer 23 with an electro-optic material 24 between them. The desired correction function is introduced by delaying the modulating signal applied to different portions of the electro-optic material 24 corresponding to different portions of the observed scene by a proper amount. That is, the modulating signal received by the center of the area observed must be delayed less than that from the periphery of the area if the countour fringes are to represent altitude contours rather than slant range contours. Effectively this delays the light received from the center of the area observed more than that from the periphery of the area.

The desired delay function can be introduced by providing means for addressing separate regions of the electro-optic material 24 independently. This is accomplished by providing electrodes 25 in the form of individual, concentric, conductive rings on one (the upper) surface of electro-optic element 24 and a single electrode 26 on the opposite surface. Each individual concentric ring electrode is connected to a different tap 27 of a delay line 28 and a driving voltage generator 10 is electrically connected between the delay line 28 and the single electrode 26. Thus, the driving voltage $e_c$ for the camera light modulator 7 is applied to the delay line 28 whose taps are connected to electro-optical element 24 so that the voltage effectively "sweeps" the electro-optic element causing a varying delay of the light transmission between the periphery and the central portion of the image received. The modulation function $f_c(t)$ of the camera light modulator 7, which is a function of both space and time, is dependent upon the waveform of applied voltage $e_c$ and the delay provided by delay line 27.

Using sinusoidal modulation of the light source, the intensity at the film is again given by $$I_c = a'(x', y')[1 + \cos(\omega t - 2kr)] f_c(t)$$

$$\cong a'(x', y') \{1 + \cos[\omega t - 2kz - k(x^2 + y^2/r)]\} f_c(t)$$

The latter equation shows the quadratic error or departure from the desired altitude contour measurement $z$ which is to be compensated for by camera modulation function $f_c$.

The coordinates at the intermediate image in the camera light modulator 7 are given by $x''$ and $y''$. These are related to ground coordinates $x''$ and $y''$ in terms of the demagnification M of the objective lens 17 where $x'' = Mx$ and $Y'' = My$. The modulation function $f_c(t, x'', y'')$ required for the desired compensation is given by $$e_c[t - K(x^2 + y^2)]$$

where K is a constant proportional to the delay per tap. This spatial modulation function is realized by having the time of arrival of the modulation signal $e_c(t)$ proportional to the square of the radius of the concentric circle electrodes 25. One way of achieving this is by having the circles defining the electrodes 25 equally spaced in radius, with the taps 27 on the delay line 28 increasing quadratically in delay from the origin. Another way of achieving a delay time proportional to the square of the radius is to have uniformly spaced tabs 27 on a delay line 28 applied to an array of concentric rings in the form of a zone plate whose periodicity is proportional to the radius and therefore whose period is proportional to the inverse of the radius. In each case, the value used for the radius is a reasonable average based on the altitude.

When the camera light modulator voltage source 10 is sinusoidal the modulation function becomes $$f_c + \cos[\omega t - \omega K M^2 (x^2 + y^2)].$$

If the delay line taps and magnification are adjusted so that $rcKm^2 = 1$ then the integrated recorded intensity is given by $$\bar{I}_c = a'(x', y')[1 + \tfrac{1}{2}\cos 2kz]$$

where the additional quadratic term has been cancelled by the quadratic arrangement on the electro-optic cell. Thus a contour fringe pattern relating to altitude is formed by compensating for the late arriving signals for relatively large values of $x$ and $y$ by correspondingly delaying the modulating signal.

Although the example used above is for a sinusoidal modulation voltage source, all types of modulation within the constraints previously listed can be used. Using the general notion $$\bar{I}_c = a'(x', y') \int f_c[t - KM^2(x^2+y^2)]f_L[t - 2Z/c - (x^2+y^2)/cr]dt,$$

where $KM^2 = 1/cr$ the expression becomes the cross-correlation $$\bar{I}_c = a'(x',y') [f_c(2Z/c) \star f_L(2Z/c)].$$

Figure 5:
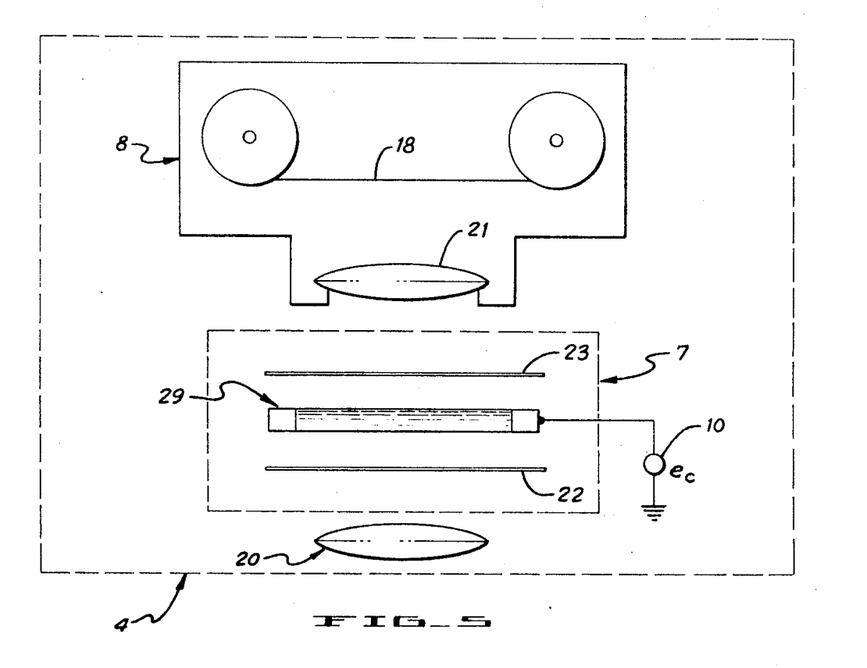
FIG. 5 is a schematic elevation showing an alternate embodiment of an image reconstructing and processing unit wherein the contour information is generated as phase modulation of a spatial grating patter and the map so recorded.

For some applications, it may be useful to create an image whereby the desired contour information appears as phase modulation of a spatial frequency carrier. FIG. 5 illustrates a system for producing and photographically recording such an image. The image, and hence the photographic record, rather than containing relatively coarse contour patterns, contains a fine high frequency grating pattern having small phase deviations. As in previous systems, a modulated light source is used to illuminate the surface being mapped, therefore only the image receiving and processing unit 4 is illustrated and described here. Again, elements of the system which are common to previous systems are given corresponding reference numerals.

The reflected light is imaged, using an objective lens 20 onto a moving grating structure which, in this case, is a sonic column 29 sandwiched by a linear polarizer 22 and analyzer 23. Voltage source 10 which produces a voltage $e_c$ that is sinusoidal in form is connected to cause propagation of a sinusoidal wave down the length (left to right in the figure) of the sonic delay line 29 at a velocity $v$ and frequency $\omega$. The polarization variations in the sonic column 29 thus create a moving grating. The image of the surface being mapped modulated by the moving grating is imaged onto photosensitive film 18 by a relay lens 21. Using the previous notation the camera modulation function referred to the film plane coordinates becomes $$f_c(t,x',y') = 1 + \cos\omega(t - x'/v)$$

assuming that the relay lens 21 has unity magnification. The resultant average intensity $\bar{I}_c$ at the film plane is given by $$\bar{I}_c = a'(x', y') \int [1 + \cos(\omega t - 2kr)][1 + \cos\omega(t - x/v)]dt$$

$$= a'(x', y') [1 + \tfrac{1}{2}\cos(\omega x'/v - 2kr)].$$

Thus the range information, $2kr$, is in the form of phase modulation on a spatial carrier of angular spatial frequency $\omega/v$.

Figure 6:
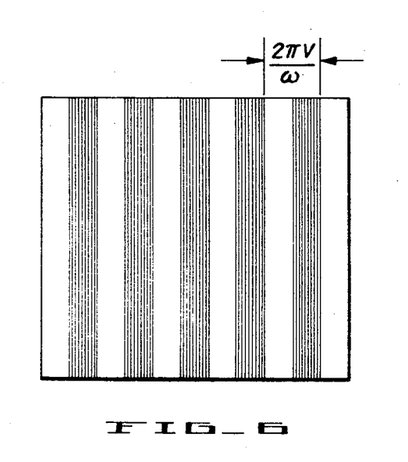
FIG. 6 is a plan view of a grating transparency to be placed in contact with the phase modulated grating pattern of FIG. 5 to create the desired contour pattern.

A linear grating transparency of the same spatial frequency as shown in FIG. 6 is placed in contact with the transparency developed on the film which records the intensity pattern or image $I_c$ to form a low frequency moire' pattern. The resultant transmission product of the two patterns, ignoring the very high frequency terms, is given by $$T = a'(x', y') [1 + \tfrac{1}{2}\cos(\omega x'/v - 2kr)] [1 + \cos\omega x'/v]$$

$$= a'(x',y') [1 + \tfrac{1}{4}\cos 2kr] + \text{high spatial frequency terms}.$$

Figure 7:
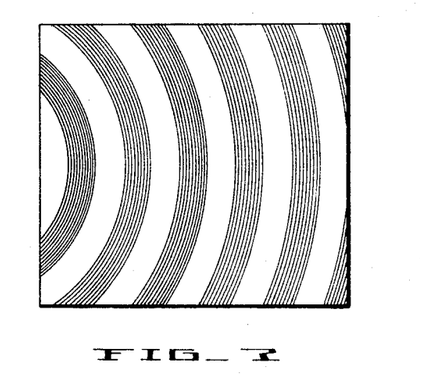
FIG. 7 is a plan view of a zone plate transparency to be placed in contact with the phase modulated grating pattern to correct the altitude contour for lateral displacement from the center of the area map so that the altitude contours are accurate.

Thus the moire' pattern contains the range contours. If, however, the linear grating transparency of FIG. 6 is replaced by a grating transparency which is quadratically modulated in phase in the manner of a zone plate as shown in FIG. 7, the contours represent altitude directly. The transmission between the two transparencies using the quadratic approximations previously developed, is given by $$T \cong a'(x',y') [1 + \cos(\omega x'/v - 2kZ - k[x^2+y^2]/r)]$$

$$\times [1 + \cos(\omega x'/v - KM^2[x^2+y^2])]$$

$$\cong a'(x',y') [1 + \tfrac{1}{4}\cos(2kZ + k/r - KM^2)(x^2+y^2))] + \text{high frequency terms,}$$

where $M$ is the demagnification of the objective lens and $K$ is a constant of proportionality which indicates the degree of curvature of the zone plate pattern in FIG. 7. When $k/r = KM^2$, the contour fringes represent altitude directly. As before, a reasonable average value of the slant range $r$ is used.

Figure 8:
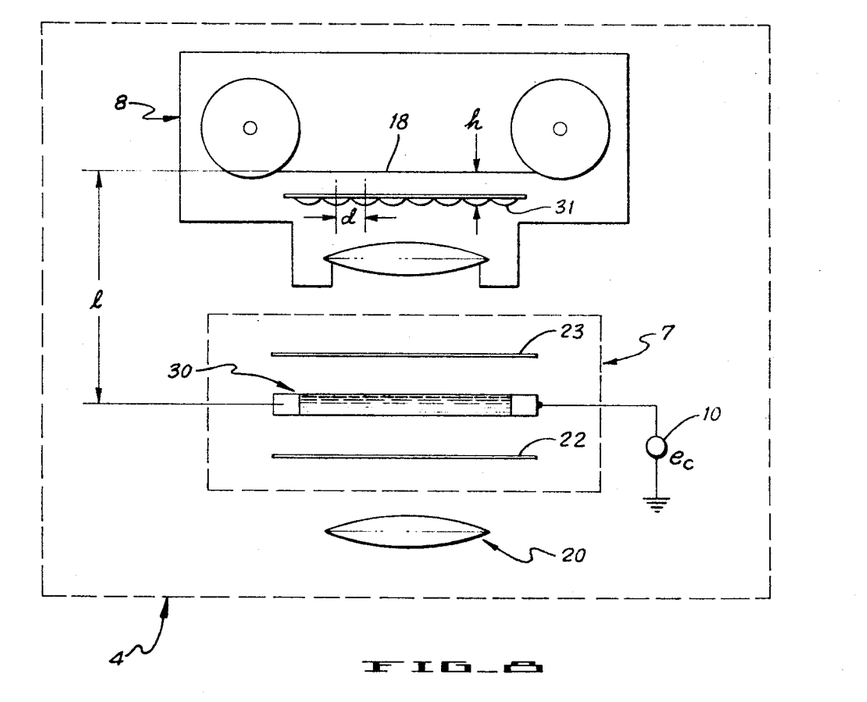
FIG. 8 is a side elevation of another image reconstructing and processing unit useful in the system of FIG. 1 where the contour information is presented and, if desired, recorded as phase modulation as a spatial grating pattern.

FIG. 8 is a diagram of the same basic moving grating system as shown in FIG. 5 except that a different method is used to create the moving grating which avoids the relay lens 21. A short ultrasonic delay line 30 whose propagation time is one cycle of the modulation frequency of its driving voltage source 10 is placed close to the exit pupil of objective lens 20 and sandwiched by polarizer 22 and analyzer 23. Thus a single transparent strip propagates along the exit pupil. A lenticular lens array 31 is placed close to the film plane separated by a distance $h$ equal to the focal length of the lenslets of the array 31. The geometry is arranged so that the wavelength of the modulating frequency in the sonic column $2\pi v/\omega$ multiplied by the separation distance $h$ of the lenticular lenses from the film 18 is equal to the spacing between the lenslets $d$ multiplied by the distance from the film to the sonic column 29. This geometric arrangement where $2\pi v h = d l \omega$ insures that, as the sonic wave propagates one cycle through the column, the resultant image from each lenslet will propagate through one cycle of the lenslet spatial frequency and thus behave like a continuous moving lens. The remainder of the analysis is exactly as before except that the effective velocity of the grating at the film plane $v'$ is $d\omega/2\pi$.

As an alternative to the sonic column 29 in FIG. 8, an array of electro-optic light valves (not shown) can be used in the exit pupil of the lens. The valves are switched in sequence to create the moving image of a slit at the exit pupil of the lens. Four of these, for example, can be placed alongside each other and successively turned on at the frequency $\omega$.

Figures 9, 10:
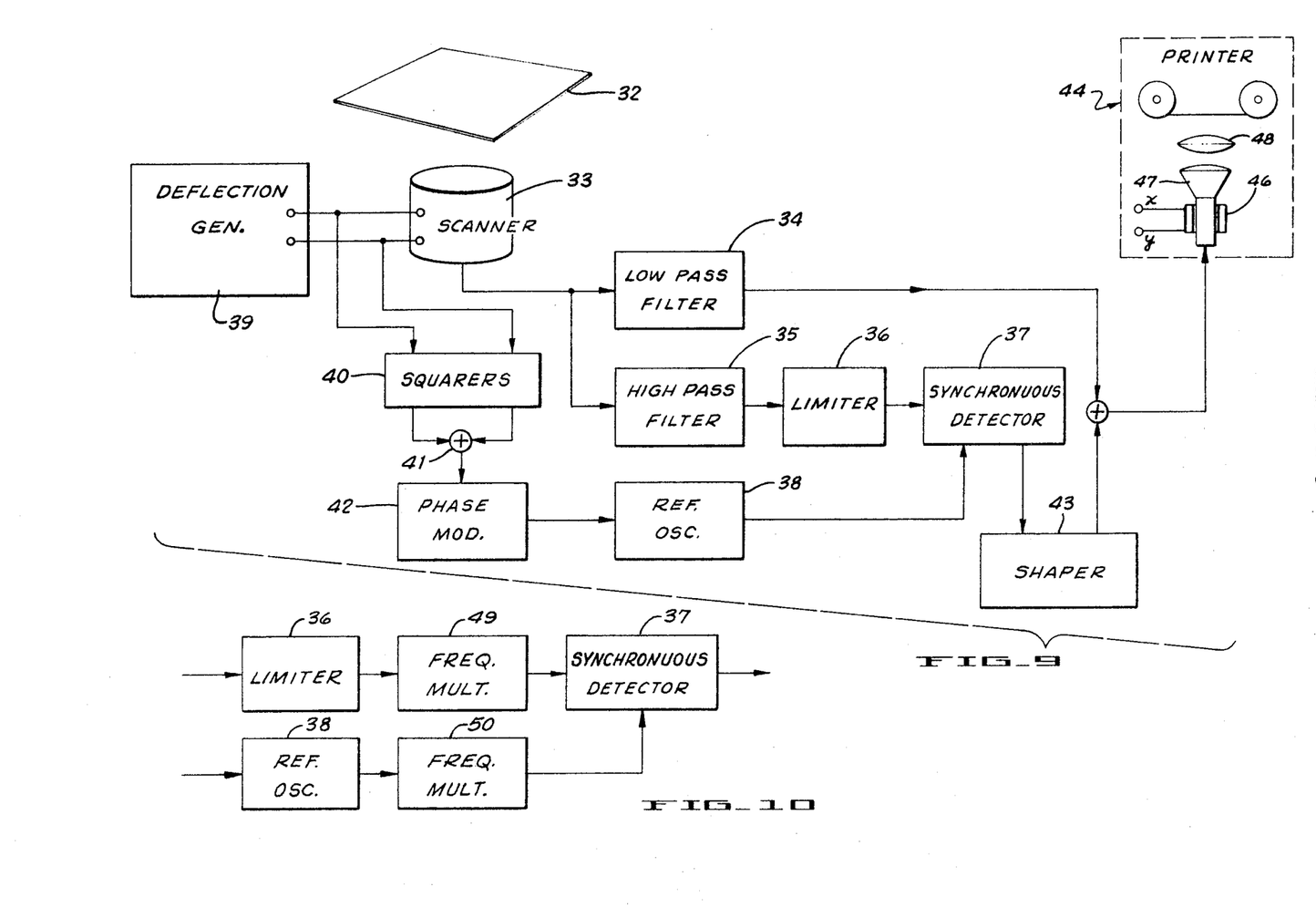
FIG. 9 is a block diagram schematically illustrating another system wherein a television camera scans the phase modulated grating pattern as generated by the system illustrated in FIG. 5 or 8 and means are provided for separating the contour information from the picture information so that both sets of information can be presented either singly or superimposed.
FIG. 10 is a block diagram illustrating a means for increasing the altitude sensitivity of the system of FIG. 10 by multiplying the phase modulated contour pattern generated by an integral factor $n$ whereby the contour height interval is reduced by the factor $n$.

Rather than decoding the high frequency pattern with a contact transparency, it can be decoded electrically as shown in FIG. 9. The intensity pattern of an image, or as illustrated here, a picture 32 is $$I_c = a'(x',y') [1 + \tfrac{1}{2}\cos(\omega x'/v - 2kr)]$$

which has been recorded by the moving grating system. The picture 32 is scanned by a scanner 33 which can be either a television camera or any of a variety of well known facsimile scanners. All individual components of FIG. 9 are conventional and can be found in basic reference works, therefore, they are illustrated in block form to simplify both the drawing and description.

In order to separate the high frequency contour information portion of the scanner output signal from the low frequency general image or picture information, a low pass filter 34 and a high pass filter 35 are each connected to receive the electrical output signal from scanner 33. Thus, low pass filter 34 passes the general image or picture information $a'(x',y')$ and blocks the high frequency contour signal and the high-pass filter 35 passes only the high frequency contour signal $a'(x',y') \cos [\hat{\omega}t - 2kr]$. $\hat{\omega}$ is the electrical frequency formed when the grating is scanned.

There are a number of reasons for separating the contour information signal from the general picture information signal. For example, it may be desirable to utilize or display either, or both, the picture or the contours individually. Primarily, however, it is generally desirable to operate on the contour information to produce constant amplitude contour lines and/or change the range contour information to altitude contour information. The arrangement illustrated in FIG. 9 provides for all of these alternatives.

The means of operating on the high frequency contour information signal to produce constant amplitude contour lines includes a limiter 36 connected to receive the output of the high pass filter 35, a synchronous detector 37 connected to operate on the output of limiter 36 and a reference oscillator 38 which is also connected to provide an input to the synchronous detector 37. The limiter 36 converts the general image information signal to the form $\cos [\hat{\omega}t - 2kr]$ and reference oscillator 38 can supply a constant amplitude reference signal of the form $\cos\hat{\omega}t$ to the synchronous detector 37 so as to produce a voltage of the form $\cos 2kr$ in the output. The output signal of this form contains the range contour pattern information. Such a pattern can be generated on the face of a cathode ray tube if the signal in this form is properly applied.

If an altitude contour pattern is desired rather than the range contour pattern the reference oscillator 38 must be phase modulated with an applied signal of the form $x^2 + y^2$ to create a reference signal of the form $\cos(\hat{\omega}t - K[x^2 + y^2])$ where $K = k/r$. This can be accomplished in a number of ways, however, since an $x,y$ deflector generator 39 is required to produce deflection signals for the picture scanner 33, it is convenient to use its output. The $x$ and $y$ deflection signals from the deflector generator 39 are connected to a squarer 40 so that they are individually squared. The squared $x$ and $y$ signals are then applied to an adder 41 to produce the $x^2 + y^2$ signal that is in turn applied to a phase modulator 42. The phase modulator 42 is connected to phase modulate reference oscillator 38 so that the proper correction is applied to synchronous detector 37 to produce an electrical signal having the altitude contour information.

The sinusoidal contour signal, be it $\cos 2kr$ or $\cos 2kz$, is applied to shaper 43 where it can be shaped into a more convenient waveform. A narrow pulse is normally more desirable for a contour map because it occupies less area and is more readily delineated. A conventional clipper, differentiator and gate can shape the sinusoidal contour signal into narrow pulses. If a display of contours only is desired, the shaper output is applied directly to a printer 44. If a composite of contour lines on the picture is desired, the shaped contour signal can be combined with the picture information signal out of low pass filter 34 as by connecting both signals to an adder 45. The signal from the adder 45, which contains both image and contour information may be printed by applying it to the printer 44. The printer 44 shown consists of a display cathode ray tube 46 which is intensity modulated by the composite signal and deflected synchronously with the same signals as those applied to the scanner 33. A printer objective lens 47 images the faceplate of the cathode ray tube 46 onto the medium where it is to be utilized; here a photographic film 48 to record the contoured pattern.

As shown in FIG. 9 a scanned signal has the flexibility of allowing a number of operations such as limiting and phase modulation. Another degree of flexibility where the contour density can be increased by an integer factor $n$ thus decreasing the contour interval by the factor $n$ can be provided with relatively minor modifications. As previously stated, this limiter 36 converts the general image information signal to the form $\cos[\hat{\omega}t - 2kr]$. By connecting a frequency multiplier 49 to receive the output of the limiter 36, the signal $\cos n [\hat{\omega}t - 2kr]$ is generated. That is, both the frequency and the phase are multiplied by $n$. Either the reference oscillator 38 can be made to generate a frequency $n\hat{\omega}$ or, as shown in FIG. 9, the reference oscillator 38 can operate at a frequency $\hat{\omega}$ and an additional frequency multiplier 50 identical to multiplier 49 can be inserted in the system between the oscillator 38 and synchronous detector 37 to create a reference signal $\cos n\hat{\omega}t$. Thus the output from synchronous detector 37 will be $\cos 2knr$, providing a range contour fringe at intervals of $\lambda/2nr$. If the reference oscillator 38 is phase modulated with a signal proportional to $(x^2 + y^2)$ then the output of the additional frequency multiplier 50 which follows it will be $\cos n(\hat{\omega}t - K[x^2 + y^2])$. In this case the output of synchronous detector 37 will be $\cos 2knZ$, providing altitude contours at intervals of $\lambda/2nz$.

While particular embodiments of the invention have been shown and described, it will of course be understood that the invention is not limited thereto since many modifications in the optical arrangements, scanning techniques and electronic processing can be made. It is contemplated that the appended claims will cover any such modifications as fall within the true spirit and scope of the invention.

What is claimed is:

1. Apparatus for producing an image of the physical features of a region in a way to delinate relative positions and elevations of such features including light source means to provide incident light for illuminating the surface of the region to be imaged, image forming means to receive the light reflected from the said surface of said region and form an image thereof at a given image plane, and temporal modulating means for temporally modulating light from said light source means and said light reflected from said surface, at least one of the incident light and the reflected light being modulated at a periodic rate whereby light interference fringes are produced on the image of said surface which fringes are indicative of altitude variations of surface features.

2. Apparatus as defined in claim 1 wherein photosensitive means is provided to receive the image of said surface with the said light interference fringes thereon whereby a photographic reproduction of the said image may be made.

3. Apparatus as defined in claim 1 wherein said means for modulating the said incident light includes a means for pulsing said light source means.

4. Apparatus as defined in claim 1 wherein said means for modulating the reflected light from said surface constitutes a sinusoidally driven light modulator positioned in the path of said reflected light.

5. Apparatus as defined in claim 1 wherein said means for modulating said incident light constitutes a sinusoidally driven light modulator interposed between said light source means and said surface.

6. Apparatus as defined in claim 1 wherein said means for modulating the said incident light and the said reflected light constitutes a common light modulator in the path of both the incident light from said light source to said surface and the said reflected light.

7. Apparatus as defined in claim 1 wherein said image forming means includes an image intensifier for increasing the intensity of the reflected light from said illuminated surface.

8. Apparatus as defined in claim 7 wherein means is provided for modulating said image intensifier whereby said image intensifier constitutes the means for modulating the reflected light from said illuminated surface.

9. Apparatus as defined in claim 1 wherein said means for modulating the reflected light is distributed over the image plane so that different areas of the image receive the modulating signal at different times.

10. Apparatus as defined in claim 9 including means for forming an intermediate image of said illuminated surface and the said means for modulating the reflected light is placed at said intermediate image.

11. Apparatus as defined in claim 9 wherein said means for modulating the reflected light is an electro-optic cell having electrically conductive electrode on opposite surfaces thereof, the said electrodes on at least one surface thereof having the configuration of spaced apart concentric rings whereby different radii of the image can be modulated at different times.

12. Apparatus as defined in claim 11 including a tapped delay-line, means connecting different taps on said delay lines to different ones of said concentric ring electrodes for driving the different electrodes and thereby causing a variation in the time of light modulation under different ones of said concentric ring electrodes.

13. Apparatus as defined in claim 12 where the amount of delay for each concentric ring electrode is proportional to the square of its radius.

14. Apparatus as defined in claim 9 wherein said means for modulating the reflected light consists of a moving grating means whereby the range information appears as phase variations of a grating structure on said image.

15. Apparatus for decoding the altitude contour pattern from a grating transparency containing range information which appears as phase variations of a grating structure produced by the apparatus defined in claim 14, including a grating transparency having the same periodicity as the said moving grating transparency positioned adjacent the said grating transparency containing range information and means to transmit light through both of the said grating transparencies, whereby a resultant transmission product is produced which contains range contours.

16. Apparatus as defined in claim 15 wherein said grating transparency is spatially modulated in phase in proportion to the square of the distance from its geometric center.

17. Apparatus as defined in claim 14 wherein said moving grating structure means is a sonic light modulation cell and means is provided to propagate a periodic wave through said sonic cell.

18. Apparatus as defined in claim 14 wherein said moving grating structure includes a stationary lenticular lens array and a coarse moving grating means where the periodicity and spacings of the lenticular lens array and the coarse moving grating are in a collimating relationship thereby to create the image of a moving grating.

19. Apparatus as defined in claim 18 wherein said coarse moving grating means is a sonic light modulation cell and means is provided to cause a periodic wave to propagate through said sonic cell.

20. Apparatus as defined in claim 18 in which said coarse moving grating means is a plurality of electro-optic light valves which are driven in sequence at a periodic rate.

21. Apparatus as defined in claim 14 including scanning means for scanning the resultant image so as to produce an electrical output, reference signal means to derive an electrical reference signal, product detector means for taking the product of said electrical output from the scanner and said reference signal means thereby to decode said phase variations into an altitude contour pattern.

22. Apparatus as defined in claim 21 including phase modulating means for phase shifting said electrical reference signal proportionally to the square of the distance from the scanning position of said scanning means to the center of the image.

23. Apparatus as defined in claim 21 including a band-pass filter having a pass band which includes the frequency that is produced by scanning the grating structure whereby the electrical signal containing the contour information is separated from the electrical signal containing the image information.

24. Apparatus as defined in claim 21 including a limiter means for making the contour signal independent of the picture intensity, product detector means for decoding the contour signal and shaping means for shaping the contour signal into the desired format.

25. Apparatus as defined in claim 23 including a frequency multiplier which is connected to receive the output of said band pass filter and thereby multiply the phase variations in the electrical signal containing the contour information by an integer factor $n$, whereby the contour interval is reduced by the integer factor $n$.

26. Apparatus as defined in claim 23 including a low-pass filter connected in parallel with said band-pass filter for passing the electrical signal containing the general image information and combining means electrically connected to receive the output of said low-pass filter thereby to combine the electrical signal containing the said general image information and the electrical signal containing the said shaped contour information.

27. Apparatus as defined in claim 14 wherein photosensitive means is provided in the plane of the said image whereby a recording may be made thereof.

28. Apparatus as defined in claim 14 including scanning means for scanning the resultant recording so as to produce an electrical output, reference signal means to derive an electrical reference signal, product detector means for taking the product of said electrical output from the scanner and said reference signal means thereby to decode said phase variations into an altitude contour pattern.

29. Apparatus as defined in claim 28 including phase modulating means for phase shifting said electrical reference signal proportionally to the square of the distance from the scanning position of said scanning means to the center of the image.

30. Apparatus as defined in claim 28 including a band-pass filter having a pass band which includes the frequency that is produced by scanning the grating structure whereby the electrical signal containing the contour information is separated from the electrical signal containing the image information.

31. Apparatus as defined in claim 28 including a limiter means for making the contour signal independent of the picture intensity, product detector means for decoding the contour signal and shaping means for shaping the contour signal into the desired format.

32. Apparatus as defined in claim 30 including a frequency multiplier which is connected to receive the output of said band pass filter and thereby multiply the phase variations in the electrical signal containing the contour information by an integer factor $n$, whereby the contour interval is reduced by the integer factor $n$.

33. Apparatus as defined in claim 30 including a low-pass filter connected in parallel with said band-pass filter for passing the electrical signal containing the general image information and combining means electrically connected to receive the output of said low-pass filter thereby to combine the electrical signal containing the said general image information and the electrical signal containing the said shaped contour information.

* * * * *